US009205791B2

(12) United States Patent
Yoon et al.

(10) Patent No.: US 9,205,791 B2
(45) Date of Patent: Dec. 8, 2015

(54) BUMPER BACK BEAM MADE OF COMPOSITE MATERIAL AND HAVING IMPROVED ENERGY ABSORPTION RATE, AND BUMPER INCLUDING SAME

(71) Applicant: LG Hausys, Ltd., Seoul (KR)

(72) Inventors: Yong-Hoon Yoon, Daejeon (KR); Yong-Kil Kil, Gimpo-si (KR); Hee-June Kim, Seongnam-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/413,590

(22) PCT Filed: Jun. 25, 2013

(86) PCT No.: PCT/KR2013/005600
§ 371 (c)(1),
(2) Date: Jan. 8, 2015

(87) PCT Pub. No.: WO2014/010844
PCT Pub. Date: Jan. 16, 2014

(65) Prior Publication Data
US 2015/0137538 A1     May 21, 2015

(30) Foreign Application Priority Data
Jul. 10, 2012  (KR) .................. 10-2012-0074922

(51) Int. Cl.
*B60R 19/03* (2006.01)
*B60R 19/24* (2006.01)
*B60R 19/18* (2006.01)

(52) U.S. Cl.
CPC ............ *B60R 19/03* (2013.01); *B60R 19/24* (2013.01); *B60R 2019/1833* (2013.01); *B60R 2019/247* (2013.01)

(58) Field of Classification Search
CPC ........ B60R 19/03; B60R 19/18; B60R 19/34; B60R 2019/18; B60R 2019/1806; B60R 2019/1836; B60R 2019/1833; B60R 2019/1853; B60R 2019/24; B60R 2019/26
USPC ................... 293/120–122, 154, 155
See application file for complete search history.

(56) References Cited

U.S. PATENT DOCUMENTS 4,252,355 A * 2/1981 Goupy et al. .............. 293/120
4,968,076 A * 11/1990 Kuroki ...................... 293/121
(Continued)

FOREIGN PATENT DOCUMENTS

| JP | 2001233147 A | 8/2001 |
| JP | 2012062012 A | 3/2012 |

(Continued)

OTHER PUBLICATIONS

International Search Report for PCT/KR2013/005600 mailed on Aug. 21, 2013.

*Primary Examiner* — Dennis H Pedder
(74) *Attorney, Agent, or Firm* — Hauptman Ham, LLP

(57) ABSTRACT

The present invention provides a bumper including: the bumper back beam made of a composite material, which has an arch-shaped collision surface, one side surface of which is formed so as to extend in a box shape from the collision surface, and a flange surface of which is formed so as to be bent outward from the side surface and made of the fiber-reinforced composite material, wherein the flange surface is fastened to a stay which is cut into a plurality of units based on a fastening point; and said stay, which is fastened to the bumper back beam, wherein a fastening hole corresponding to the fastening point is formed as an elongate hole.

11 Claims, 5 Drawing Sheets

(56) References Cited

U.S. PATENT DOCUMENTS

| | | | |
|---|---|---|---|
| 5,150,935 A * | 9/1992 | Glance et al. | 293/136 |
| 6,082,792 A * | 7/2000 | Evans et al. | 293/133 |
| 6,299,226 B1 * | 10/2001 | Kroning et al. | 293/120 |
| 8,967,687 B2 * | 3/2015 | Kosaka et al. | 293/155 |
| 2008/0001417 A1 * | 1/2008 | Asahi et al. | 293/155 |
| 2009/0066095 A1 | 3/2009 | Karlander | |

FOREIGN PATENT DOCUMENTS

| | | |
|---|---|---|
| KR | 1020050115485 A | 12/2005 |
| KR | 100629422 B1 | 9/2006 |
| KR | 100818722 B1 | 4/2008 |
| KR | 20100035274 A | 4/2010 |
| KR | 100999153 B1 | 12/2010 |

* cited by examiner

BUMPER BACK BEAM MADE OF COMPOSITE MATERIAL AND HAVING IMPROVED ENERGY ABSORPTION RATE, AND BUMPER INCLUDING SAME

CROSS REFERENCE TO RELATED APPLICATION

This application claims the priority of Korean Patent Application No. 10-2012-0074922 filed on Jul. 10, 2012 in the Korean Patent and Trademark Office. Further, this application is the National Phase application of International Application No. PCT/KR2013/005600 filed on Jun. 25, 2013, which is incorporated herein by reference in its entirety.

TECHNICAL FIELD

The present invention relates to a bumper back beam made of a fiber-reinforced composite material, and, more particularly, to a bumper back beam made of a composite material, which has improved energy absorption rate by enlarging an area subjected to tensile stress upon deformation caused by collision.

BACKGROUND ART

A bumper assembly of an automobile is composed a bumper fascia, an energy absorber, a back beam, a stay, and other components, from the outermost side thereof.

Among these components, the stay is placed between the back beam and a car body to interconnect the same. Generally, fastening holes are provided corresponding to the back beam and the stay, respectively, and the back beam and the stay are fastened to each other through the fastening holes by fastening members, such as bolts and nuts, and the like.

When a vehicle collides at a certain speed limit, collision is absorbed through deformation of the energy absorber, deformation and destruction of the back beam, deformation of the stay, and the like. In this case, various patterns of stress are applied to the back beam. Stress can be classified into tensile stress, compression stress and shear stress according to directions of the stress, and different types of stress can appear at different sites on the back beam.

In order to achieve efficient absorption of collision, various shapes of the back beam have been studied and developed together with diversification of materials thereof.

Particularly, for the purpose of weight reduction, development of a back beam using a fiber-reinforced composite material formed by mixing reinforced fibers and plastic (synthetic resin) materials as main components has been conducted in recent years.

According to length, fibers can be classified into staple fibers, filament fibers and continuous fibers, and it is known that the back beam formed of the fiber-reinforced composite material exhibits better mechanical properties and provides better weight reduction effects with increasing length of the fibers.

The composite material is often formed using a composite material of staple fibers and continuous fibers and a composite material of filament fibers and continuous fibers simultaneously in order to use mechanical properties of the continuous fibers and formability of the composite material with the staple fibers or the filament fibers. The back beam of these composite materials may be manufactured by various methods such as injection molding, compression, RTM, welding, and the like.

However, it is known that the fiber-reinforced composite material exhibits a high energy absorption rate when receiving tensile stress, and a low energy absorption rate upon receiving compression or shear stress.

A prior art literature relevant to the present invention includes Korean Patent Publication No. 10-2005-0115485 (published on Dec. 8, 2005) entitled "Bolting structure of bumper stay."

DISCLOSURE

Technical Problem

It is an aspect of the present invention to provide a bumper back beam that is formed of a composite material and can convert shear stress caused by compression into tensile stress, thereby improving energy absorption rate.

It is another aspect of the present invention to provide a bumper back beam that can be slidably fastened to a stay to convert compression stress applied to the bumper back beam into tensile stress, thereby improving energy absorption rate.

Technical Solution

In accordance with one aspect of the present invention, a bumper back beam made of a composite material includes: an arc-shaped collision surface; a side surface extending from the collision surface to form a box shape; and a flange surface bent outward from the side surface, wherein the composite material includes a fiber-reinforced composite material and the flange surfaces are fastened to a stay and cut into a plurality of sections based on fastening points.

The side surface may be cut in an arc shape together with the flange surface.

The flange surface may be cut into four sections based on four fastening points.

In accordance with another aspect of the present invention, a bumper includes: a bumper back beam made of a composite material, the bumper back beam including an arc-shaped collision surface, a side surface extending from the collision surface to form a box shape, and a flange surface bent outward from the side surface, wherein the composite material comprises a fiber-reinforced composite material and the flange surface is fastened to a stay and cut into a plurality of sections based on fastening points; and a stay fastened to the bumper back beam, and having fastening holes that correspond to the fastening points and have an elongated-hole shape.

The bumper back beam may be slidably fastened to the stay.

The fastening points may include a pair of inside fastening points and a pair of outside fastening points, and an angle of inclination of the outside fastening points may be larger than an angle of inclination of the inside fastening points.

The bumper back beam may be configured to increase a distance between the plural fastening points while sliding on the stay.

Advantageous Effects

According to the present invention, a bumper back beam made of a composite material allows tensile stress to be applied to an area subjected to compression stress, thereby improving an energy absorption rate.

According to the present invention, the bumper back beam made of a composite material reduces an area subjected to compression stress, thereby improving durability of the bumper back beam.

BEST MODE

Figure 1:
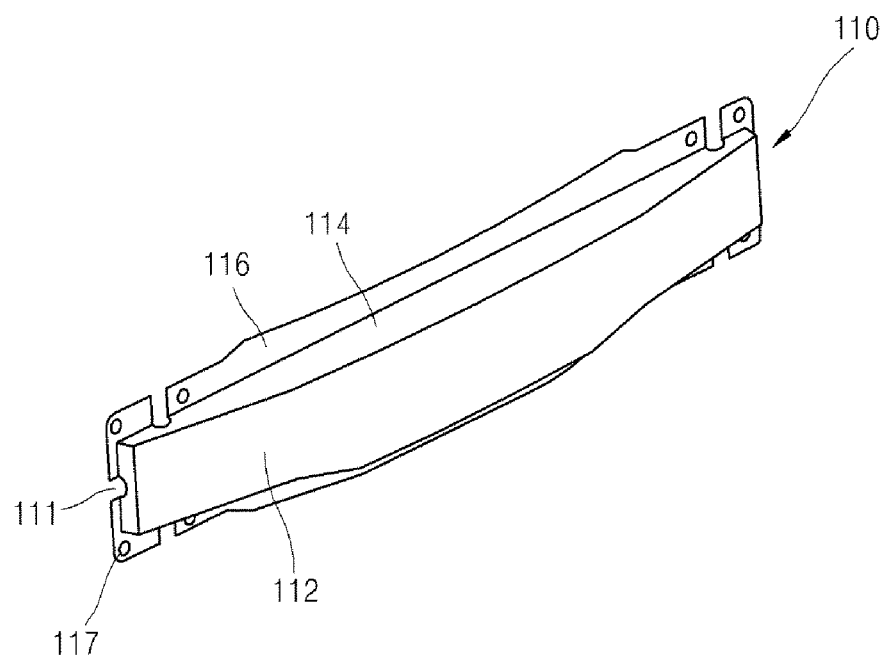
FIG. 1 is a perspective view of a bumper back beam made of a composite material according to one embodiment of the present invention.

Hereinafter, a bumper back beam made of a composite material with improved energy absorption rate according to one embodiment of the present invention and a bumper comprising the same will be described in detail with reference to the accompanying drawings.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the invention by those skilled in the art. The scope of the invention is defined only by the claims.

Like components will be denoted by like reference numerals throughout the specification.

In addition, sizes of elements constituting the present invention in the drawings are exaggerated for clarity of the description. It will be understood that when an element is referred to be as being "placed in" or "connected to" another element, the element may be directly placed on the other element or may be separated a predetermined distance therefrom. Where the element is separated a predetermined distance from the other element, any description of a third element to fix or connect the element to the other element may be omitted.

FIG. 1 is a perspective view of a bumper back beam made of a composite material according to one embodiment of the present invention. The present invention is directed to improvement in energy absorption rate of the bumper back beam made of a composite material by changing the shape of the bumper back beam and allowing the back beam to be slidably fastened to the stay such that tensile stress is induced at an area of the bumper back beam to which compression stress is applied upon collision.

As shown, a bumper back beam 110 according to one embodiment of the invention includes an arc-shaped collision surface 112, a side surface 114 extending from the collision surface 112 to form a box shape, and a flange surface 116 bent outward from the side surfaces 114. The bumper back beam 110 according to the present invention is formed of a fiber-reinforced composite material and has an integral body. As reinforced fibers, staple fibers, filament fibers, a mixture of staple fibers and continuous fibers, or a mixture of filament fibers and continuous fiber, and the like may be used.

The bumper back beam 110 is fastened at opposite sides thereof to a stay. According to the present invention, the flange surface 116 of the bumper back beam is fastened to the stay and is cut based on fastening points 117. In addition, a cut portion 111 of the flange surface 116 has an arc shape and extends to the corresponding side surface 114.

In other words, according to the present invention, plural fastening points 117 are divided by the cut portions 111. In this embodiment, the flange surface 116 is provided at opposite sides thereof with four fastening points 117 and is also divided into a plurality of sections corresponding to the number of fastening points 117.

Figure 2:
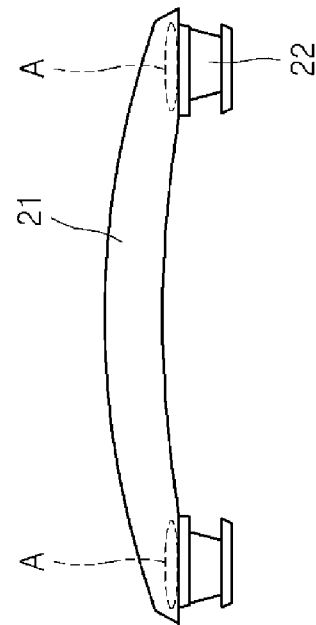
FIG. 2 is a schematic diagram showing a change in shape of the bumper back beam upon collision.
Figure 2:
Figure 2:
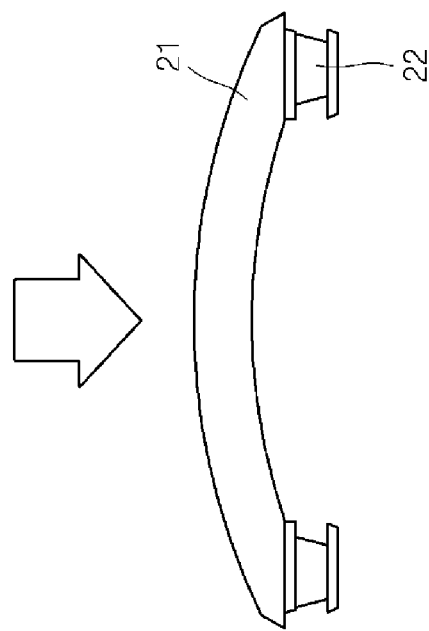

FIG. 2 is a schematic diagram showing a change in shape of the bumper back beam upon collision.

As shown, the arc-shaped bumper back beam 21 is fastened at opposite sides thereof to the stay 22. When shock is applied to a front side of the bumper back beam, the center of the arc-shaped bumper back beam 21 is pressed and reduced in overall length thereof, and the entirety of the bumper back beam 21 is subjected to compression stress.

Although the composite material has excellent tensile stress due to inherent properties thereof, the composite material has relatively weak compression stress. This is because compression stress causes delamination of the composite material, thereby causing rapid deformation or damage to a stress-concentrated area of the composite material.

According to the present invention, the bumper back beam to be fastened to the stay is divided based on the fastening points 117 such that the fastening points can be radially widened upon collision, thereby allowing tensile stress to be applied to an area subjected to compression stress.

Figure 3:
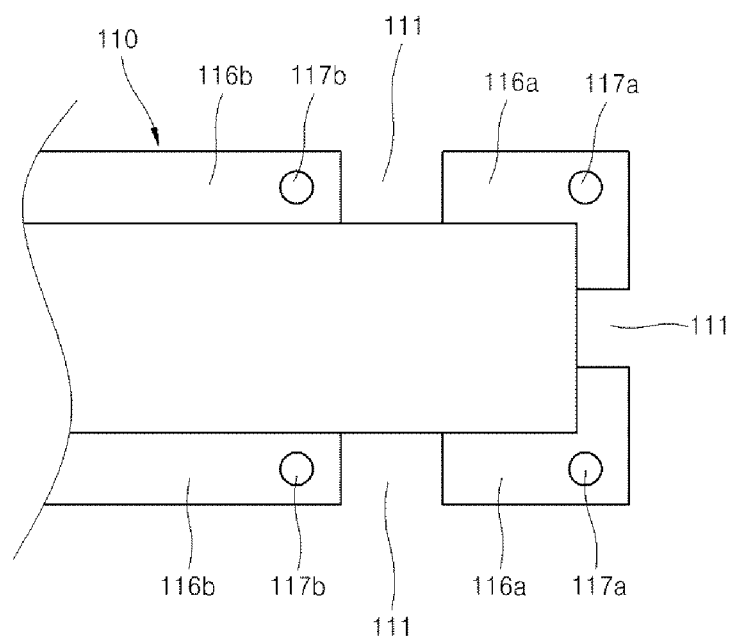
FIG. 3 is a front view of the bumper back beam according to the embodiment of the present invention, showing fastening points of the bumper back beam.
Figure 4:
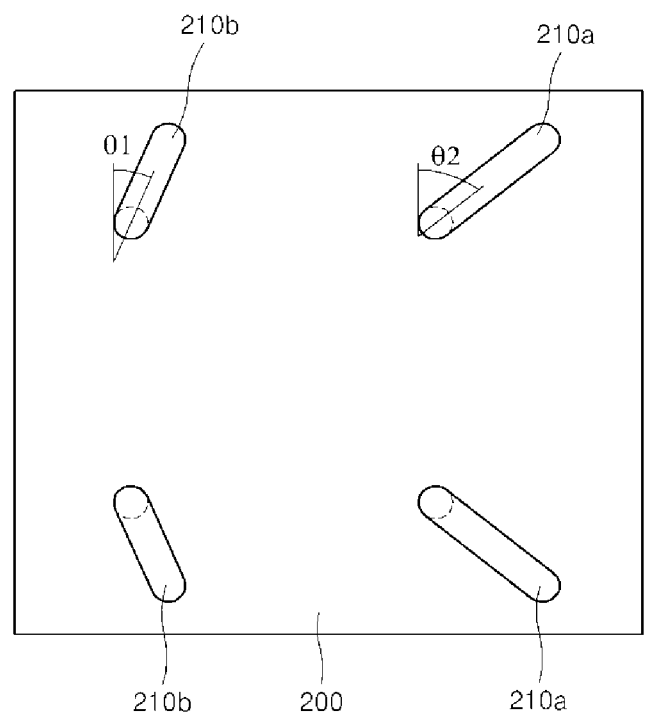
FIG. 4 is a front view of a stay according to one embodiment of the present invention, showing fastening points of the stay.

FIG. 3 is a front view of the bumper back beam according to the embodiment of the present invention, showing fastening points of the bumper back beam, and FIG. 4 is a front view of a stay according to one embodiment of the present invention, showing fastening points of the stay.

These drawings show enlarged views of left-side fastening points of the bumper back beam 110. The bumper back beam is formed with four fastening points 117a, 117b, in which a pair of inside fastening points 117b is formed at an inner side of the bumper back beam corresponding to a central side thereof and a pair of outside fastening points 117b is formed at an outer side of the bumper back beam.

The stay 200 is formed with fastening holes 210a, 210b, which have an elongated-hole shape and correspond to the shape of each of the fastening points.

The elongated-hole shape of the fastening holes 210a, 210b formed on the stay 200 enables the fastening points 117a, 117b of the bumper back beam to be slidably moved on the stay upon collision.

With such a structure, divided flange surfaces 116a, 116b of the bumper back beam 110 may be guided along the fastening holes 210a, 210b.

Referring to FIG. 4, an angle of inclination ($\theta 2$) of the outside fastening holes 201a is larger than an angle of inclination ($\theta 1$) of the inside fastening holes 210b.

With this structure, the divided flange surfaces 116a, 116b of the bumper back beam 110 are radially separated from each other when compression stress is applied to the bumper back beam, whereby the compression stress can be converted into tensile stress. That is, the fastening points 117a, 117b are separated from each other while moving along the fastening holes 210a, 210b, and such a change in shape of the bumper back beam causes tensile stress to be applied to the side surfaces of the bumper back beam.

The fastening points 117a, 117b of the bumper back beam 110 and the fastening holes 210a, 210b of the stay 200 may be connected to each other by fastening members, such as bolts and nuts, or rivets. Here, the fastening points are connected to the fastening holes such that the fastening points 117a, 117b of the bumper back beam can be slid along the fastening holes 210a, 210b of the stay 200.

In this embodiment, the bumper back beam includes four fastening points, and the flange surface is divided into four sections. Alternatively, the flange surface may be divided into two sections, each of which including a pair of inside fastening points and a pair of outside fastening points, or a pair of upper fastening points and a pair of lower fastening points. The flange surfaces may be divided in different ways.

Figure 5:
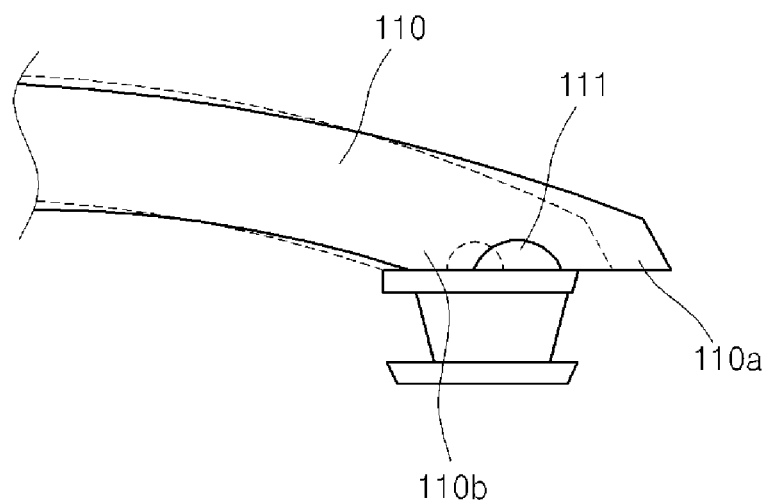
FIG. 5 is a side view of the bumper back beam according to the embodiment of the present invention, showing a motion of the bumper back beam upon collision.

FIG. 5 is a side view of the bumper back beam according to the embodiment of the present invention, showing a motion of the bumper back beam upon collision.

In this figure, a dotted line indicates the shape of the bumper back beam 110 before collision, and a solid line indicates the shape of the bumper back beam 110 after collision.

As shown therein, when the shape of the bumper back beam 110 is changed by collision, both a side surface 110b connected to the inside fastening points and a side surface 110a connected to the outside fastening points are moved to the right side. Here, the side surface 110a connected to the outside fastening points is subjected to a greater shift.

Thus, the side surface 110b connected to the inside fastening points and the side surface 110a connected to the outside fastening points are separated from each other, whereby the arc-shape of the cut portion 111 is extended, thereby allowing tensile stress to be applied to the bumper back beam.

As such, compression force applied to the bumper back beam upon collision is converted into tensile stress, thereby providing an effect of improving an energy absorption rate of the bumper back beam made of a composite material.

This effect is most prominent when the composite material of the bumper back beam comprises continuous fibers among combinations of back beam materials (staple fibers, filament fibers, a mixture of staple fibers and continuous fibers, a mixture of filament fibers and a continuous film).

As described above, in the bumper back beam made of the composite material according to the present invention and a bumper including the bumper back beam, the flange surface fastened to the stay is divided based on the fastening points and the fastening points are separated from each other upon collision, thereby allowing tensile stress to be applied to the bumper back beam upon collision, instead of compression stress.

The composite material is delaminated and damaged upon being applied with compression stress thereto, and tensile strength of the composite material is relatively higher than compression strength thereof. According to the present invention, the bumper back beam allows tensile stress to be applied to an area at which compression stress can be concentrated, thereby improving durability of the bumper back beam made of the composite material.

Although some exemplary embodiments have been described herein, it will be apparent to those skilled in the art that the present invention is not limited thereto and various modifications, changes and alterations can be made without departing from the spirit and scope of the invention. Therefore, it should be understood that the foregoing embodiments are provided for illustration only and are not to be construed in any way as limiting the present invention.

LIST OF REFERENCE NUMERALS

110: Bumper back beam
112: Collision surface
114: Side surface
116: Flange surface
200: Stay

The invention claimed is:

1. A bumper back beam made of a composite material, comprising:
    an arc-shaped collision surface;
    a side surface extending from the collision surface to form a box shape; and
    a flange surface bent outward from the side surface,
    wherein the composite material comprises a fiber-reinforced composite material and the flange surface is fastened to a stay and cut into a plurality of sections based on fastening points, and
    wherein the flange surface has a cut portion having an arc shape that extends to the side surface.

2. The bumper back according to claim 1, wherein the flange surface is cut into four sections based on four fastening points.

3. A bumper comprising:
    a bumper back beam made of a composite material, the bumper back beam including
    an arc-shaped collision surface,
    a side surface extending from the collision surface to form a box shape, and
    a flange surface bent outward from the side surface,
    wherein the composite material comprises a fiber-reinforced composite material and the flange surface is fastened to a stay and cut into a plurality of sections based on fastening points; and a stay fastened to the bumper back beam and having fastening holes corresponding to the fastening points, the fastening holes having an elongated-hole shape,
    wherein the flange surface has a cut portion having an arc shape that extends to the side surface.

4. The bumper according to claim 3, wherein the bumper back beam is slidably fastened to the stay.

5. The bumper according to claim 3, wherein the bumper back beam is configured to increase a distance between the plural fastening points while sliding on the stay.

6. The bumper according to claim 3, wherein the flange surface is cut into four sections based on four fastening points.

7. A bumper comprising:
    a bumper back beam made of a composite material, the bumper back beam including
    an arc-shaped collision surface,
    a side surface extending from the collision surface to form a box shape, and
    a flange surface bent outward from the side surface,
    wherein the composite material comprises a fiber-reinforced composite material and the flange surface is fastened to a stay and cut into a plurality of sections based on fastening points; and a stay fastened to the bumper back beam and having fastening holes corresponding to the fastening points, the fastening holes having an elongated-hole shape, and
    wherein the fastening holes comprise a pair of inside fastening holes and a pair of outside fastening holes, and an angle of inclination of the outside fastening holes is larger than an angle of inclination of the inside fastening holes.

8. The bumper according to claim 7, wherein the bumper back beam is slidably fastened to the stay.

9. The bumper according to claim 7, wherein the bumper back beam is configured to increase a distance between the plural fastening points while sliding on the stay.

10. The bumper according to claim 7, wherein the flange surface has a cut portion having an arc shape that extends to the side surface.

11. The bumper according to claim 7, wherein the flange surface is cut into four sections based on four fastening points.

* * * * *